Jan. 23, 1923.

R. L. FORD.
RATCHET DRIVE FOR HILL DROP PLANTERS.
FILED JUNE 20, 1918.

Inventor.
Ralph L. Ford,
By Chas. E. Lord,
Atty.

Jan. 23, 1923.					1,443,173
R. L. FORD,
RATCHET DRIVE FOR HILL DROP PLANTERS.
FILED JUNE 20, 1918.
3 SHEETS-SHEET 2

Inventor:
Ralph L. Ford,
By Chas. E. Lord
Atty.

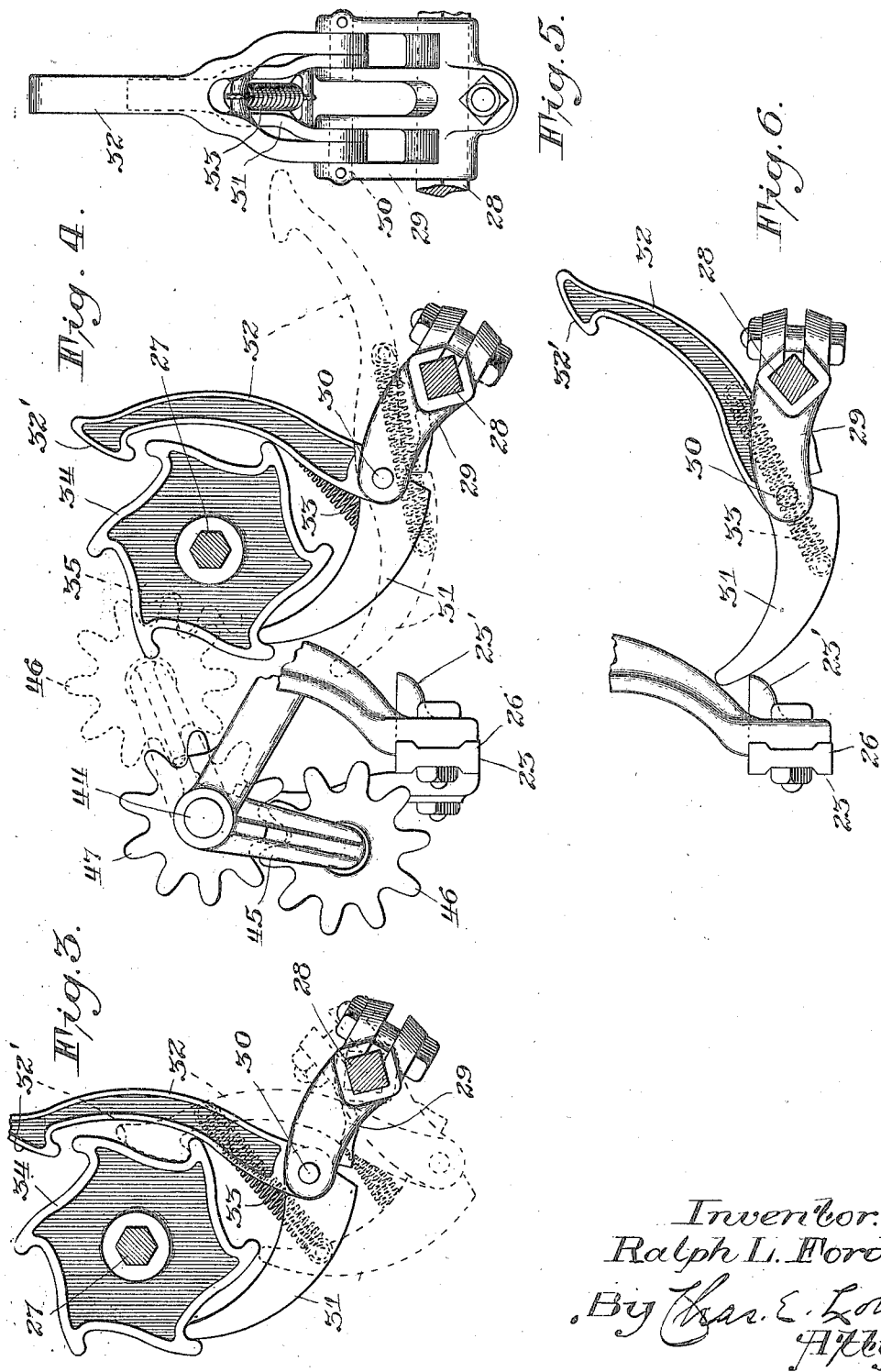

Patented Jan. 23, 1923.

1,443,173

UNITED STATES PATENT OFFICE.

RALPH L. FORD, OF CHICAGO, ILLINOIS, ASSIGNOR, BY MESNE ASSIGNMENTS, TO INTERNATIONAL HARVESTER COMPANY, A CORPORATION OF NEW JERSEY.

RATCHET DRIVE FOR HILL DROP PLANTERS.

Application filed June 20, 1918. Serial No. 240,996.

*To all whom it may concern:*

Be it known that I, RALPH L. FORD, a citizen of the United States, residing at Chicago, in the county of Cook and State of Illinois, have invented certain new and useful Improvements in Ratchet Drives for Hill Drop Planters, of which the following is a full, clear, and exact specification.

My invention relates to corn planters, and has among its objects to improve and simplify the construction of machines of this character, and more particularly that type of machine which plants the corn in hills, by eliminating certain of the elements of machines of this type, thereby accomplishing the same results now accomplished by machines of complicated and expensive construction.

With the above objects in view my invention consists of corn planting mechanism in which the seed dropping mechanism is actuated directly by power derived from the check wire.

The invention also has among its features the provision of a construction which may be easily and quickly changed from a check wire planter to a drill planter.

I have illustrated one embodiment of my invention in the accompanying drawings, and in these drawings—

Figure 1:
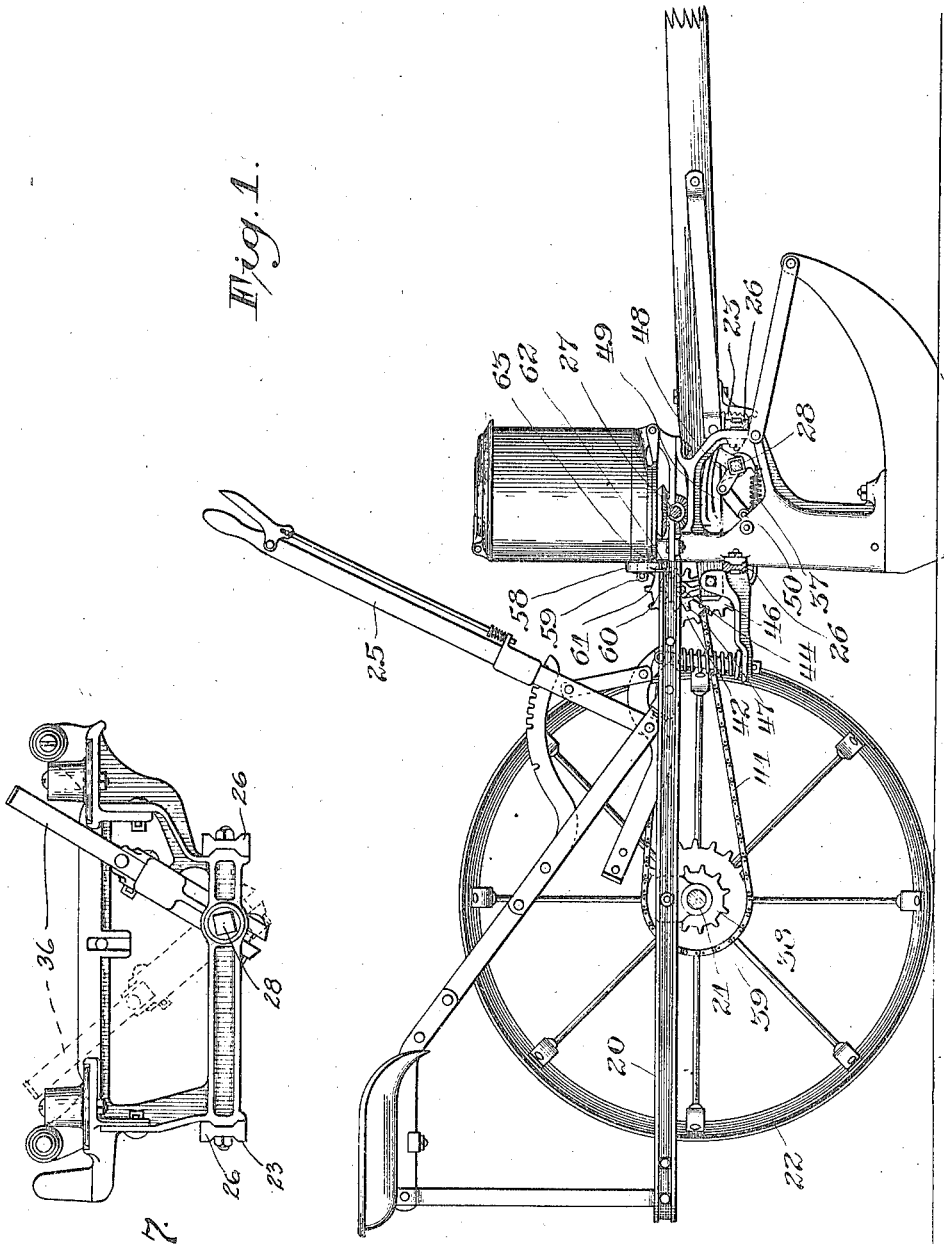
Figure 1 is a side elevation of my improved planter.

Figs. 3, 4, 5, and 6 illustrate on an enlarged scale the pawl and ratchet driving mechanism for the seed shaft; and, Fig. 7 is a side elevation of the check wire shaft and check wire fork.

The planter illustrated in the accompanying drawings comprises a frame 20 carried on an axle 21, on which are mounted the wheels 22, and the furrow opener frame 23 hinged at 24 to the frame 20, and controlled by the usual lever 25. The furrow opener frame comprises the usual transverse frame members 26, seed shaft 27, and check wire shaft 28.

In my improved construction the seed shaft is actuated directly from the check wire shaft by means of a pawl and ratchet connection, and this connection will now be described.

The check wire shaft 28 carries intermediate its ends a clamp 29, on which are pivoted at 30 two pawls 31 and 32. These pawls are connected by a spring 33, which has the double function of actuating these pawls toward each other in one position of adjustment, and of holding them apart in another position of adjustment. The frame 23 is provided with a projection 23′, located in the path of pawl 31. When the check wire fork and shaft 28 is again actuated, and the pawls are in the inoperative position shown in dotted lines in Fig. 4, the pawl 31 engages projections 23′ (see Fig. 6), and the toggle lock is broken, and pawls 31 and 32 assume their normal operative position.

This construction is well illustrated in Figs. 3, 4, and 6, and will be more fully hereinafter described.

The seed shaft carries a ratchet wheel 34, which cooperates with the pawls 31 and 32, and there is secured to this ratchet wheel adjacent thereto a gear 35. When the check wire, which passes through the usual check wire forks 36, actuates the shaft 28, the pawls 31 and 32 are moved from the position shown in full lines in Fig. 3 to the position shown in dotted lines therein, thereby rotating the ratchet wheel 34 and seed shaft 27, and actuating the seed dropping mechanism. The head 32′ of pawl 32 is shaped to fit the ring wheel 34 and comes in contact with the rim of the ratchet wheel 34 at the completion of the throw of the check fork 36 forming a stop, thereby preventing any racing of seed plate. As soon as the knot in the check wire is passed beyond the fork, the check wire shaft is returned to its normal position by the usual spring 37, and the pawl 31 is moved upwardly against the under side of one of the teeth, as shown in full lines in Fig. 3, thereby so positioning the pawls that at the next actuation of the check wire shaft the ratchet will be again actuated; also insuring the proper amount of revolution of the ratchet wheel 34 to carry a seed cell of seed plate over the discharge in seed boot. As shown in Fig. 3, the pawl 31 contacting from the under side of one of the ratchet teeth prevents the reverse rotation of the seed shaft.

In addition to providing for the checking of the corn, or planting the corn in hills, I have made provision for drilling, and this feature of the invention will next be described.

Figure 2:
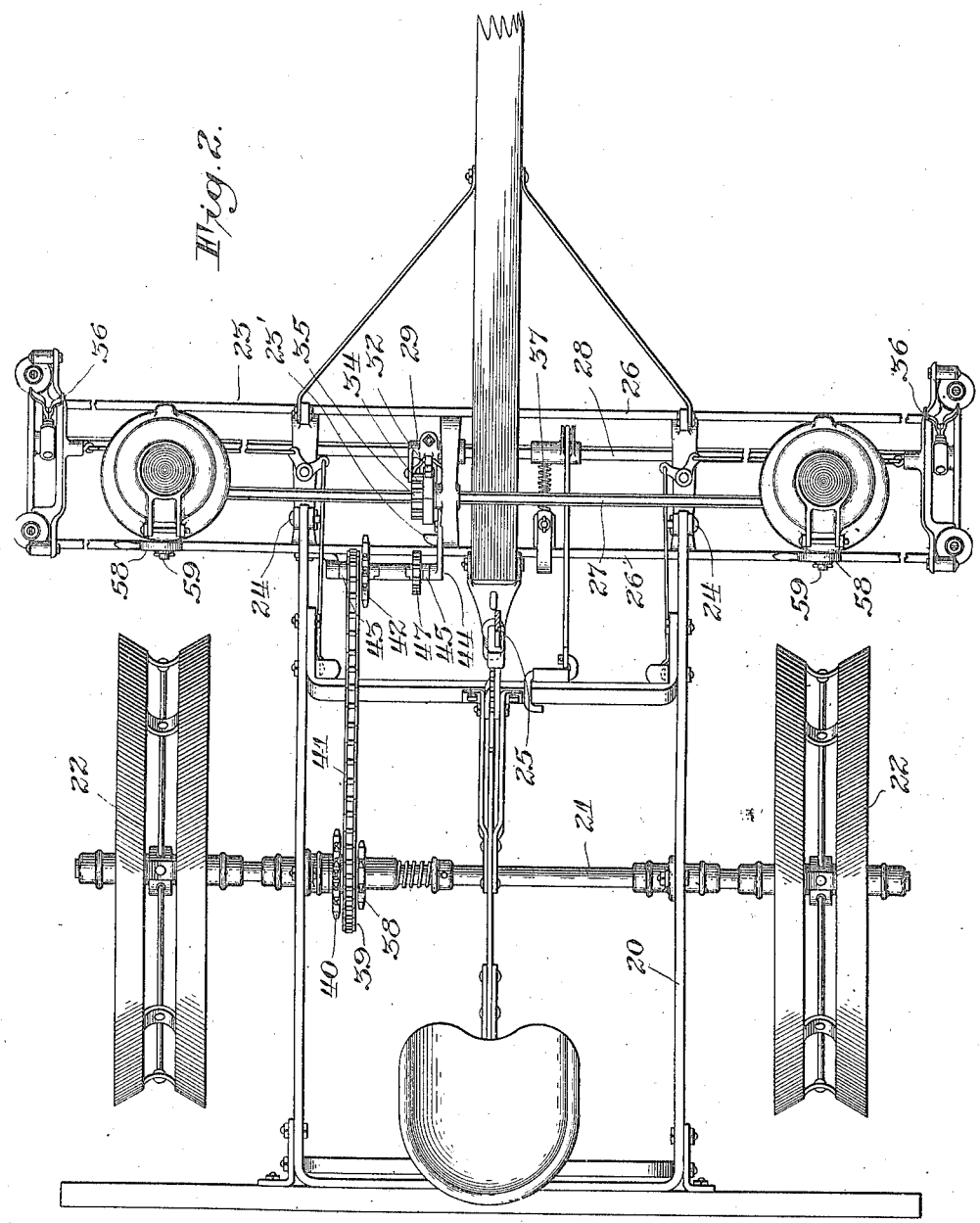
Fig. 2 is a top plan view of the same.

As shown in Figs. 1 and 2, the main axle 21 carries a series of sprocket wheels 38, 39 and 40, which may be connected by a suitable chain 41 to the sprocket wheels 42 and 43 carried by a stub shaft 44. This stub shaft also carries a swinging bracket 45, upon which is mounted a gear 46, which meshes with a gear 47 carried by the shaft 44. When it is desired to change the machine from a check row planter to a drill planter the check wire is thrown out of the check wire fork, the pawls 31 and 32 are forced apart to the dotted line position shown in Fig. 4, and are held in separated position by spring 33, and the gear 46 is swung about the shaft 44 to a position where it will mesh with the gear 35 carried on the seed shaft adjacent the ratchet wheel 34. This gear 46 then completes the connection between the main driving axle 21 and the seed shaft, thereby constantly rotating the seed shaft and drilling the corn.

From the above description it will be seen that I have provided an exceedingly practical and simple construction wherein the seed dropping mechanism is driven directly from the check wire shaft, and also a machine which may be quickly and easily changed from a check wire to a drill planter.

While I have, in the above specification, described one practical embodiment which my invention may assume, it should be understood that the invention is capable of modification, and that modifications may be made without departing from the spirit and scope of the invention as expressed in the following claims.

What I claim as new is:

1. In a corn planter, a rotatable shaft, a rock shaft, a ratchet wheel carried by said rotatable shaft, a bracket carried by said rock shaft, a plurality of pawls carried by said bracket and adapted to contact with said ratchet, and single means operable in one position of adjustment for forcing said pawls toward each other, and operable in another position of adjustment to force said pawls away from each other.

2. In a corn planter, a rotatable shaft, a rock shaft, ratchet and pawl mechanism for actuating said rotatable shaft operatively connected with said rock shaft, means for holding the pawl mechanism in inoperative position, and means actuated by operation of the rock shaft for throwing said pawl mechanism into operative position.

3. In a corn planter, a rotatable shaft, means for operating said rotatable shaft, means for holding said operating means in inoperative position, a rock shaft for actuating said operating means, and means actuated by operation of the rock shaft for throwing said operating means into operative position.

4. In a corn planter, a frame, a rock shaft, and a rotatable shaft journaled thereon, means for intermittently turning the rotatable shaft including a ratchet carried by said rotatable shaft and a plurality of pawls carried by said rock shaft, means for holding said pawls in inoperative position when the rock shaft is at rest, and means positioned for engagement by one of said pawls for throwing said pawls on initial movement of the rock shaft into operative position.

5. In a corn planter, an intermittent drive including a ratchet wheel, a rocker arm adjacent the wheel, a pair of pawls pivoted to the arm and engaging opposite teeth on the ratchet wheel, and a spring connecting the pawls near their pivots and passing from one side to the other thereof when the pawls are swung to and from each other.

6. In a corn planter, an intermittent drive including a ratchet wheel, a rocker arm adjacent the wheel, a pawl pivoted to the arm and provided with a notch adapted to engage a tooth when the arm is rocked and with a head adapted to come in contact with the wheel rim between the teeth at the end of the throw of the rocker arm.

7. In a corn planter, an intermittent drive including a ratchet wheel formed with tangentially extending teeth, a rocker arm adjacent the wheel, a pawl pivoted to the arm and provided with a notch adapted to engage a tooth when the arm is moved in one direction and with a head shaped to conform to the wheel rim between said teeth and adapted to come into contact with the rim at the end of the throw of the rocker arm.

8. In a corn planter, an intermittent drive including a ratchet wheel formed with tangentially extending teeth, a rocker arm adjacent the wheel, a pawl pivoted to the arm and provided with a notch adapted to engage a tooth when the arm is moved in one direction and with a head shaped to conform to the wheel rim between said teeth and adapted to come into contact with the rim at the end of the throw of the rocker arm, and a second pawl pivoted on the rocker and positioned opposite said first pawl and adapted to engage a tooth on the wheel at the end of the return throw of the arm.

In testimony whereof I affix my signature.

RALPH L. FORD.